BEST AVAILABLE COPY 11.3

H. Pickford, 2. Sheets. Sheet. 1.

Skate.

No. 4,191. Reissued Nov. 29. 1870.

Hasham Scott Assignee

Witnesses:
Edward Lyon Jr.
James Hunter

N. PETERS, PHOTO-LITHOGRAPHER, WASHINGTON, D. C.

H. Pickford, 2. Sheets. Sheet 2. 5

Skate.

No. 4,191. Reissued Nov. 29. 1870.

Witnesses:
Edward Lyon Jr.
Jamie Hunter

Horatio Scott
Assignee.

N. PETERS, PHOTO-LITHOGRAPHER, WASHINGTON, D. C.

280. LAND VEHICLES.

Search Room 11.3

UNITED STATES PATENT OFFICE.

HENRY PICKFORD, OF BOSTON, MASSACHUSETTS.

MODE OF FASTENING SKATES.

Specification forming part of Letters Patent No. 16,653, dated February 17, 1857; Reissued November 29, 1870, No. 4,191.

*To all whom it may concern:*

Be it known that I, HENRY PICKFORD, of Boston, in the county of Suffolk and State of Massachusetts, have invented a new and Improved Method of Fastening Skates to the Feet, of which the following is a full, clear, and exact description, reference being had to the accompanying drawings, making part of this specification, in which—

Figure 1:
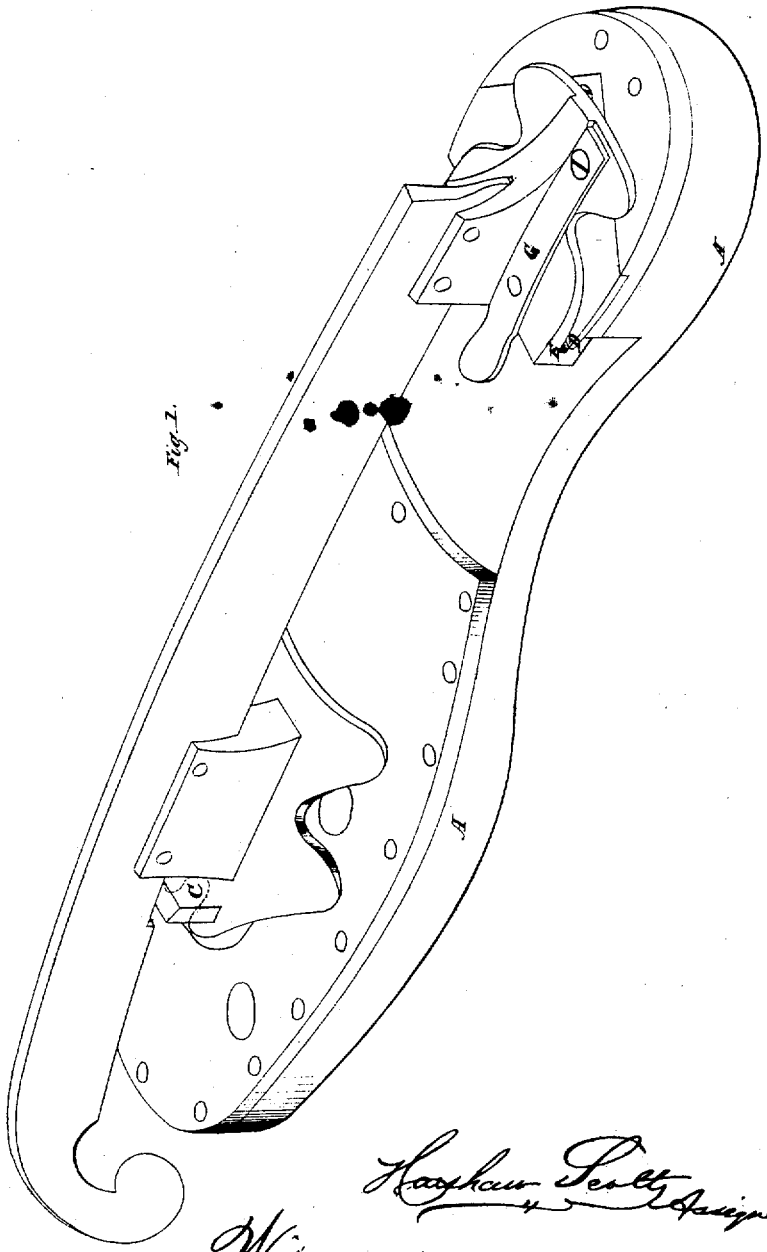
Figure 2:
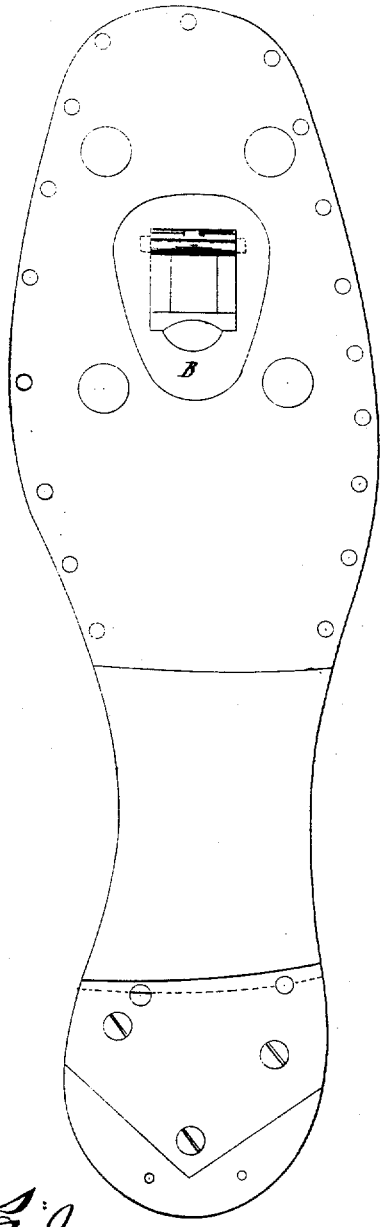
Figure 3:
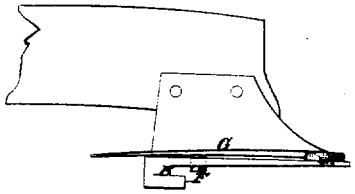
Figure 4:
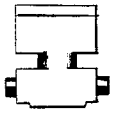

Figure 1, is a perspective view of my skate attached to the sole of the boot; Fig. 2, a plan of the sole of the boot; Figs. 3 and 4, details which will be referred to hereafter.

The ordinary mode of securing the skate to the foot, is liable to several objections. In the first place it is difficult to draw the straps so tight as is necessary in order to prevent the skate from moving on the foot, without hurting the foot itself by the ligature. 2nd, the use of straps or ligatures over the feet and ankles, checks the free action of the muscles of the feet and ankles, and this not only tends to injure them, but by pressure to impede the circulation of the blood in these members, and thereby not only to cause the feet to become cold, but to deprive the exercise of skating of much of its healthfulness and pleasure. It is found also to be no little drawback to the pleasure of skating, that so much time is taken up in pulling on, tightening and removing the skate, when the fingers are cold.

To avoid all these evils, and to secure a mode of uniting the skate quickly, firmly and securely to the foot, without impeding circulation, or checking muscular action, or injuring the foot, is the object of my present invention, which consists in a new mode of fastening skates to the feet of the skater, without the use of straps or other ligatures, by an apparatus which connects them in a simple, but secure manner to the soles of the boots or shoes only, as will now be more fully described.

In the drawings A is the sole of the boot, to which near the toe is secured in a suitable manner a plate B, having a recess in which fits a tongue (Fig. 4) which is hinged to the plate and may be raised up into a vertical position or one at right angles to the plate, this tongue has cut in it from either side a notch *a*, leaving in the center a stem *b*, and top or head *c*,—to the heel of the shoe is attached a plate C, which projects a short distance over the front part of the heel as at *d*, Fig. 1.

Having described the boot and parts attached thereto, I will now proceed to describe the skate and the manner of securing it to the boot.

D, is a plate from which rises the standard E. This plate has in its front end a notch *e*, (seen dotted in Fig. 1.) which fits around this stem *b*, of Fig. 4. F, is another plate from which rises the standard G—the plate F, is bent over at its front side as shown at *g*, Fig. 3, and fits over the front edge of the plate C. To F is also attached a spring *h*, from which projects a pin *i* which passes through a hole in the plate F, into a hole in the plate C. The standards E, and G, are notched to receive the blade or runner H, of the skate which is secured thereto by rivets *m*, passing through the runner and the standards E and G, the former being attached near the forward end, and the latter at the hinder end of the runner.

The mode of securing and detaching my improved skate will now be explained. When the skater is about to attach the skate to his boot, he raises the tongue, Fig. 4, into the position seen at *p*, Fig. 1, and places the notch *e*, of the plate D, against the stem *b*, of the tongue, the runner H, being in a transverse position to the length of the foot. He then brings around the hinder end of the runner toward the heel until the plate F slides over the plate C, the front end of which enters the groove *g*, in the plate F, and the pin *i* drops into the hole *k*, when the skate will be firmly attached to the boot. To remove it, he raises the spring *h*, and moves the plate F laterally away from the heel until the plate D, may be slipped out from under the head of the tongue when the skate will be free from the boot.

What I claim as my invention and desire to secure by Letters Patent, is—

Uniting the skate blade to the sole of the boot or shoe, substantially in the manner and for the purpose above described.

HENRY PICKFORD.

Witnesses:
SAM. COOPER,
P. E. TESCHEMACHER.

[FIRST PRINTED 1912.]